(12) United States Patent
Eichinger et al.

(10) Patent No.: US 10,124,871 B1
(45) Date of Patent: Nov. 13, 2018

(54) SHIFT SYSTEMS THAT FACILITATE RESILIENT MOUNTING OF AN OUTBOARD MOTOR WITH RESPECT TO A MARINE VESSEL

(71) Applicant: Brunswick Corporation, Lake Forest, IL (US)

(72) Inventors: Charles H. Eichinger, Oshkosh, WI (US); Scott G. Ahlswede, Plymouth, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/692,650

(22) Filed: Aug. 31, 2017

(51) Int. Cl.
| | |
|---|---|
| *B63H 20/20* | (2006.01) |
| *B63H 23/08* | (2006.01) |
| *B63H 20/06* | (2006.01) |
| *B63H 20/12* | (2006.01) |
| *F16H 59/04* | (2006.01) |
| *F16H 61/36* | (2006.01) |

(52) U.S. Cl.
CPC .............. *B63H 20/20* (2013.01); *B63H 20/06* (2013.01); *B63H 20/12* (2013.01); *B63H 23/08* (2013.01); *F16H 59/04* (2013.01); *F16H 61/36* (2013.01)

(58) Field of Classification Search
CPC ........ B63H 20/00; B63H 20/20; B63H 23/08; B63H 23/00; B63H 23/30; B63H 20/14; B63H 5/00; B63H 5/10
USPC .......................... 440/75, 86; 192/21, 48.7, 51
See application file for complete search history.

(56) References Cited

U.S. PATENT DOCUMENTS

| | | | | |
|---|---|---|---|---|
| 4,530,667 A | * | 7/1985 | McCormick | B63H 23/08 440/75 |
| 4,560,355 A | * | 12/1985 | McCormick | B63H 23/08 440/86 |
| 4,820,210 A | * | 4/1989 | Dretzka | B63H 21/28 440/75 |
| 4,865,570 A | * | 9/1989 | Higby | B63H 21/28 440/75 |
| 5,151,059 A | * | 9/1992 | Higby | B63H 21/28 440/75 |
| 5,470,264 A | | 11/1995 | Eick | |
| 5,585,990 A | | 12/1996 | Manning et al. | |
| 5,839,928 A | * | 11/1998 | Nakayasu | B63H 20/20 440/75 |
| 6,544,083 B1 | | 4/2003 | Sawyer et al. | |
| 8,444,446 B2 | | 5/2013 | Kuriyagawa et al. | |

(Continued)

*Primary Examiner* — Lars A Olson
(74) *Attorney, Agent, or Firm* — Andrus Intellectual Property Law, LLP

(57) ABSTRACT

An outboard motor has a mounting assembly, a powerhead, a transmission, and a shift shaft that extends from the powerhead to the transmission via a conduit in the mounting assembly. The shift shaft is positionable into a forward position in which the transmission is engaged in forward gear, reverse position in which the transmission is engaged in reverse gear, and a neutral position in which the transmission is in neutral gear. In the forward position, an upper end of the shift shaft is positioned closer to a forward side of the conduit than the aftward side of the conduit. In the reverse position, the upper end of the shift shaft is positioned closer to an aftward side of the conduit than the forward side of the conduit. In the neutral position, the upper end of the shift shaft is positioned between the forward and reverse positions.

20 Claims, 9 Drawing Sheets

(56) References Cited

U.S. PATENT DOCUMENTS 9,174,715 B1 11/2015 Hanes et al.
9,643,703 B1 5/2017 Eichinger

* cited by examiner

SHIFT SYSTEMS THAT FACILITATE RESILIENT MOUNTING OF AN OUTBOARD MOTOR WITH RESPECT TO A MARINE VESSEL

FIELD

The present disclosure relates to outboard motors, and particularly to mounting arrangements and shift systems for outboard motors.

BACKGROUND

U.S. Pat. No. 9,643,703 discloses an arrangement for coupling a vibration isolation mount to an outboard motor. A pocket is formed in a midsection housing of the outboard motor and defines a first concave surface. A cover is configured to be mounted to the midsection housing over the pocket via a plurality of fasteners. The cover defines a second, oppositely concave surface on an inner face thereof. When the cover is mounted to the midsection housing over the pocket, the first concave surface and the second concave surface together form a cavity there between for holding a vibration isolation mount therein. One of the first concave surface and the second concave surface has a protrusion that extends into the cavity and contacts the mount held therein upon tightening of the plurality of fasteners to hold the cover over mount in the pocket. A mounting arrangement is also provided.

U.S. Pat. No. 9,174,715 discloses an apparatus for changing gear in a marine propulsion system. A cam rotates about a first axis with a shift shaft. The cam has a body and an arm that radially extends from the body with respect to the first axis. A cam follower moves parallel to a second axis that is perpendicular to the first axis to cause movement of a clutch, thereby enacting a gear change. The cam follower defines a pocket that is elongated with respect to the second axis and a recess that extends from the pocket along a third axis that is perpendicular to the first and second axes. The cam is disposed in the pocket and the arm extends into the recess. During a constant rotation of the shift shaft in a first direction about the first axis, the cam follower moves with respect to the second axis to enact the gear change and also dwells with respect to the second axis.

U.S. Pat. No. 6,544,083 discloses a gear shift mechanism. A cam structure comprises a protrusion that is shaped to extend into a channel formed in a cam follower structure. The cam follower structure can be provided with first and second channels that allow the protrusion of the cam to be extended into either which accommodates both port and starboard shifting mechanisms. The cam surface formed on the protrusion of the cam moves in contact with a selected cam follower surface formed in the selected one of two alternative channels to cause the cam follower to move axially and to cause a clutch member to engage with either a first or second drive gear.

SUMMARY

This Summary is provided to introduce a selection of concepts that are further described below in the Detailed Description. This Summary is not intended to identify key or essential features of the claimed subject matter, nor is it intended to be used as an aide in limiting the scope of the claimed subject matter. In certain examples, an outboard motor comprises a mounting assembly for connecting the outboard motor to a marine vessel, a powerhead, a transmission that transmits power from the powerhead to a propulsor configured to impart thrust on a body of water in which the outboard motor is operated, and a shift shaft that extends from the powerhead to the transmission via a conduit in the mounting assembly. The conduit has forward and aftward sides relative to the mounting assembly. The shift shaft is positionable into a forward position in which the transmission is engaged in forward gear, reverse position in which the transmission is engaged in reverse gear, and a neutral position in which the transmission is in neutral gear. In the forward position an upper end of the shift shaft is positioned closer to the forward side of the conduit than the aftward side of the conduit. In the reverse position the upper end of the shift shaft is positioned closer to the aftward side of the conduit than the forward side of the conduit. In the neutral position the upper end of the shift shaft is positioned between the forward and reverse positions. The arrangement thus facilitates increased fore-aft movement of the powerhead and shift shaft with respect to the mounting assembly, i.e. increased stroke of resilient mounts for the powerhead, for a common shift shaft and conduit size.

BRIEF DESCRIPTION OF THE DRAWINGS

Examples are described herein below with reference to the following figures. The same numbers are used throughout the figures to reference common features and components.

DETAILED DESCRIPTION OF THE DRAWINGS

Figure 1:
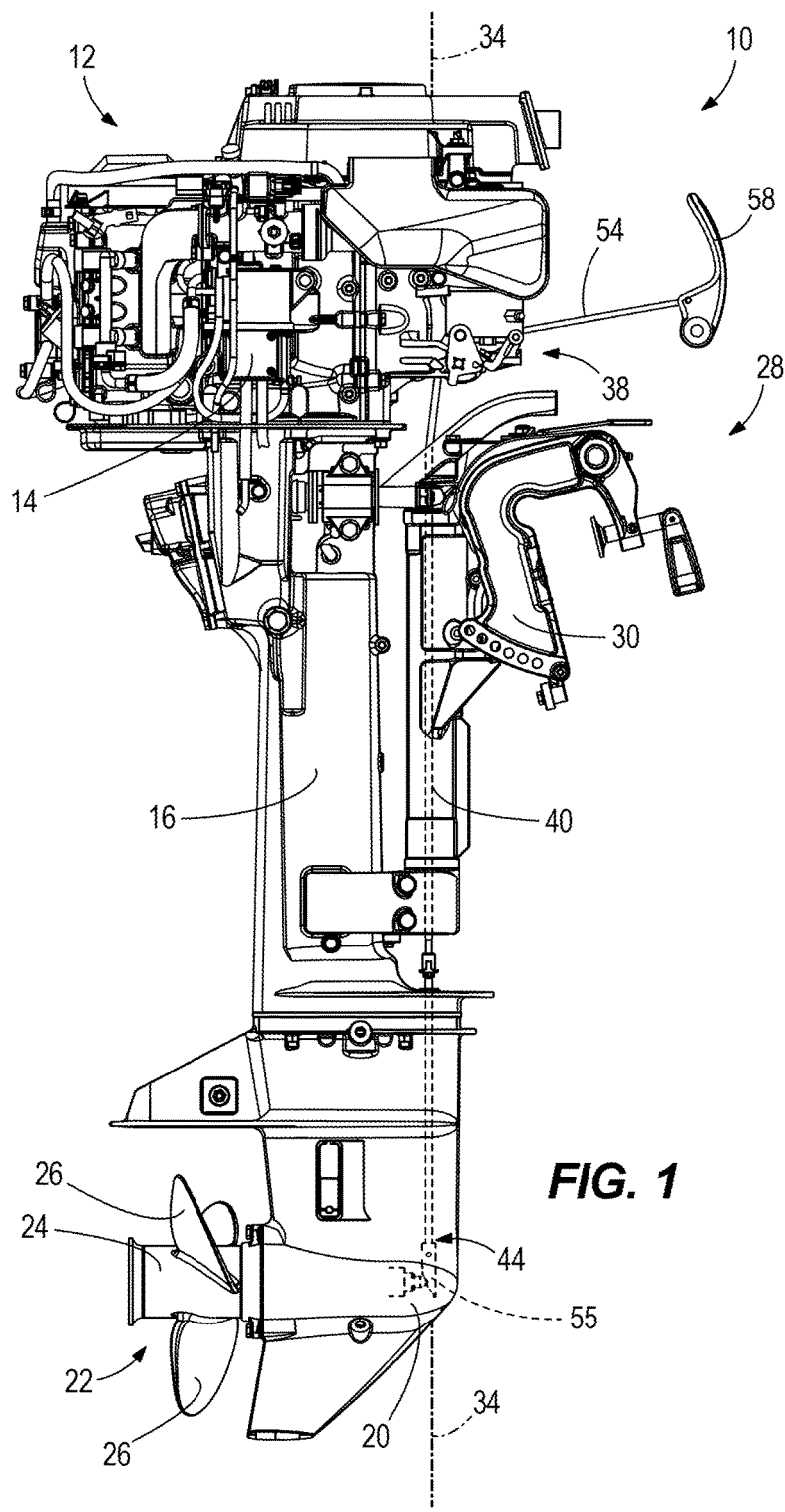
FIG. 1 is a side view of an outboard motor having portions of its cowling removed.

FIG. 1 depicts an exemplary outboard motor 10 according to the present disclosure. The outboard motor 10 has a powerhead 12 including among other things an internal combustion engine 14 that operates a generally vertically extending driveshaft (not shown), which extends downwardly from the internal combustion engine 14 through a driveshaft housing 16. As is conventional, the driveshaft has a lower end coupled to a transmission 18 (see FIGS. 4-6), which is located in a lower gearcase 20. The transmission 18 is configured to transmit power from the powerhead 12 to a propulsor 22, which is configured to impart thrust forces on a body of water in which the outboard motor 10 is operated. The type and configuration of the propulsor 22 can vary from that which is shown. In the illustrated example, the propulsor 22 includes a propeller 24 having blades 26 that are configured such that rotation of the propeller 24 causes the blades 26 to impart the noted thrust forces on the body of water.

Figure 7:
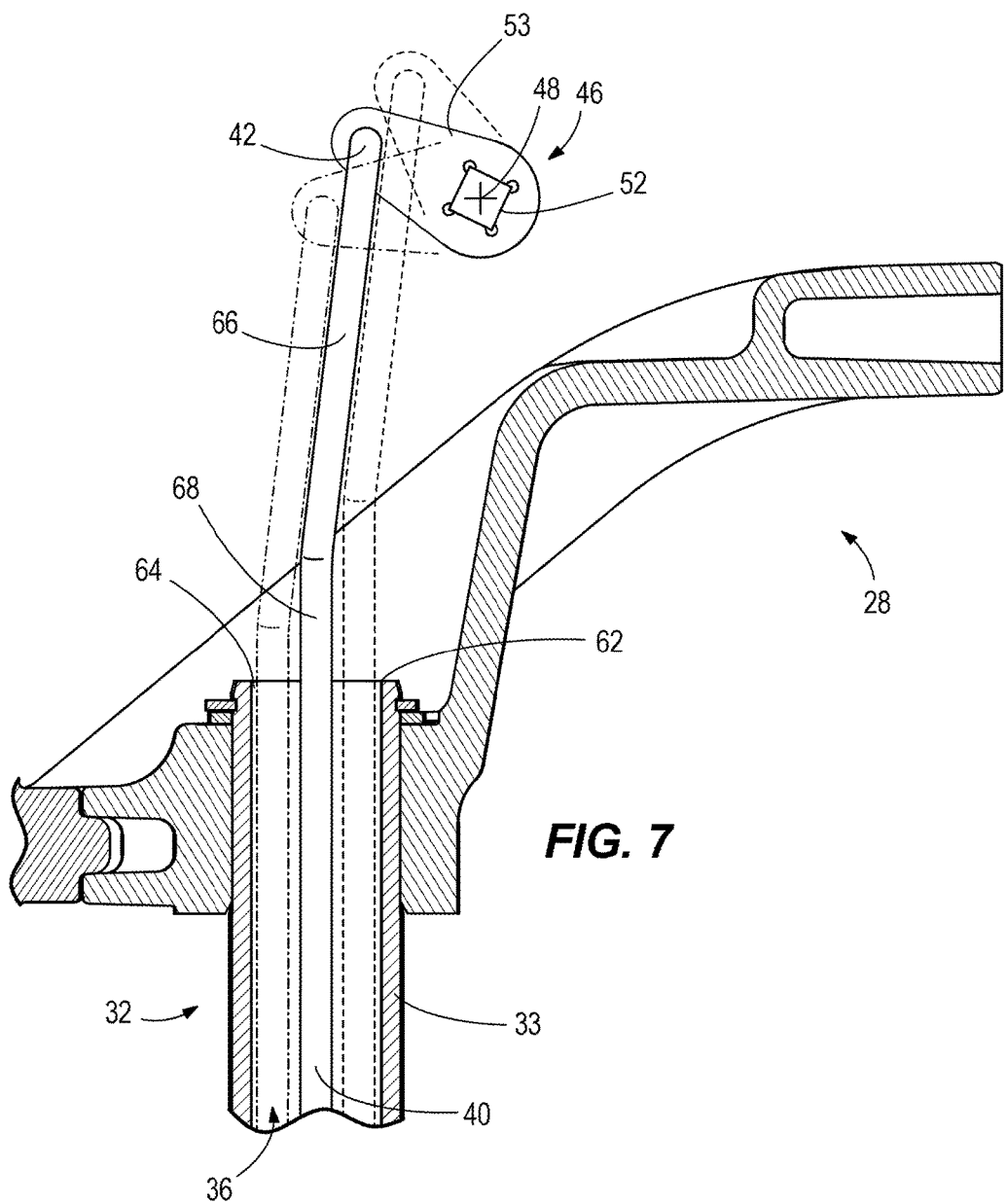
FIG. 7 is a view showing the shift shaft relative to a conduit in a mounting assembly for mounting the outboard motor to a marine vessel, specifically showing the shift shaft in solid line in neutral position and in dashed line in reverse and forward positions.

Referring to FIGS. 1 and 7, the exemplary outboard motor 10 also includes a conventional mounting assembly 28 for mounting the outboard motor 10 to a marine vessel. The type and configuration of the mounting assembly 28 can vary from that which is shown. In the illustrated example, the mounting assembly 28 includes a transom bracket 30 that is configured to rigidly clamp to the noted marine vessel, for example to the transom of the marine vessel. The mounting assembly 28 further includes a steering arm 32 (see FIG. 7) having a steering tube 33 that is configured to pivot with respect to the transom bracket 30 about a steering axis 34, thus allowing an user to steer the outboard motor 10 with respect to the marine vessel. The steering tube 33 provides a conduit 36 that extends generally vertically through the mounting assembly 28, as is conventional.

Figure 2:
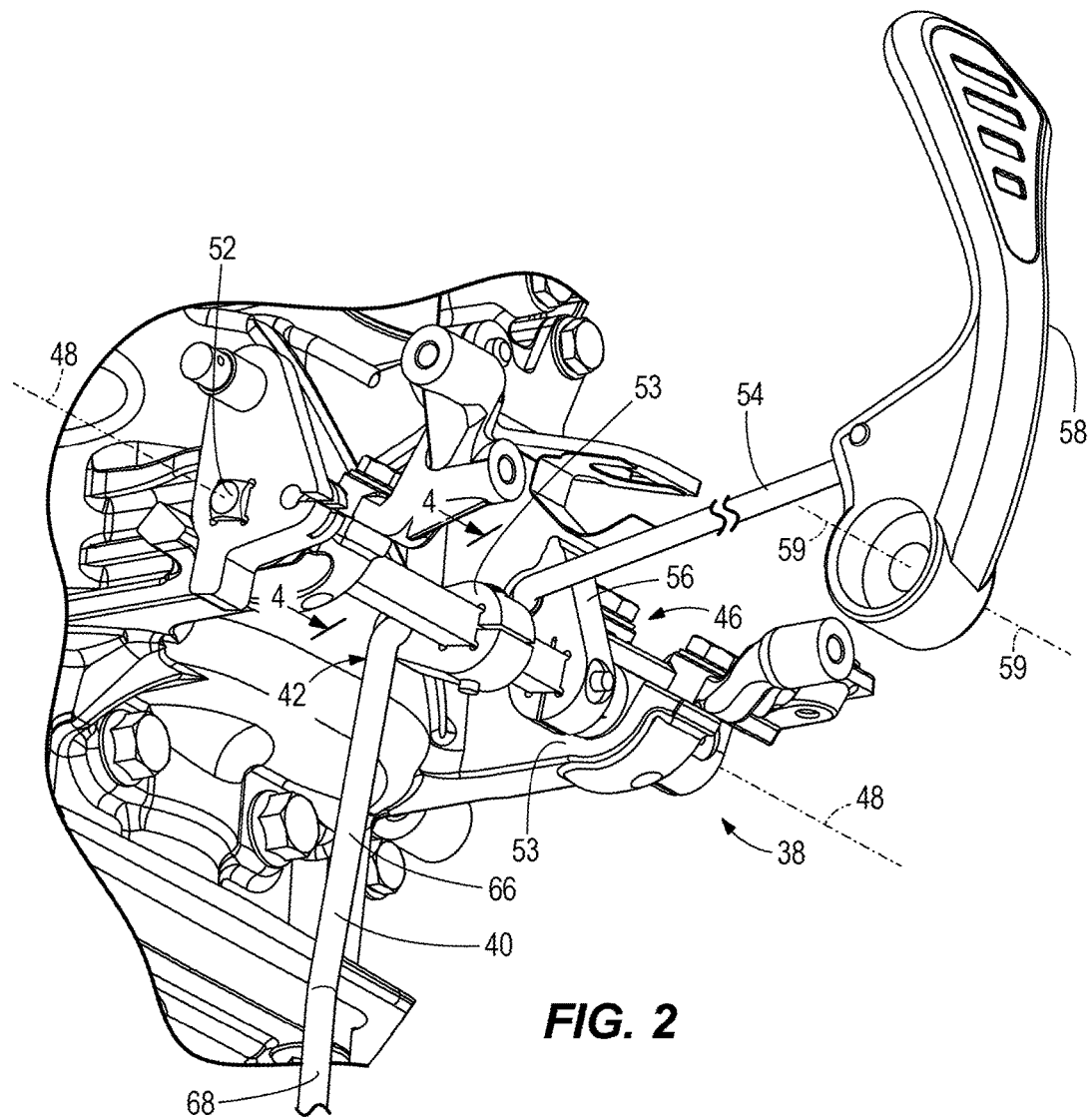
FIG. 2 is a side perspective view looking up at a shift actuator for actuating a shift shaft in the outboard motor.
Figure 3:
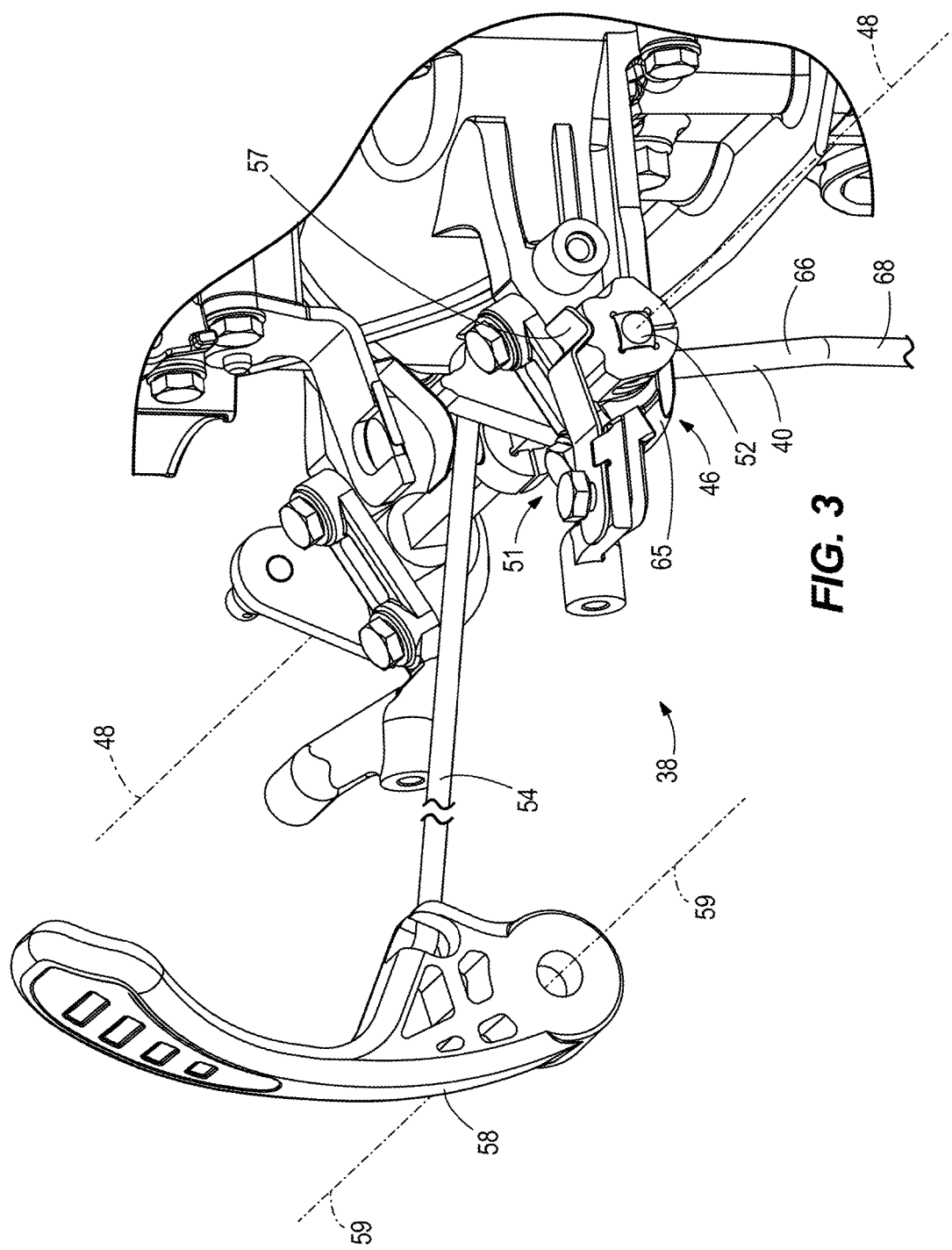
FIG. 3 is an opposite side perspective view looking down at what is shown in FIG. 2.
Figure 4:
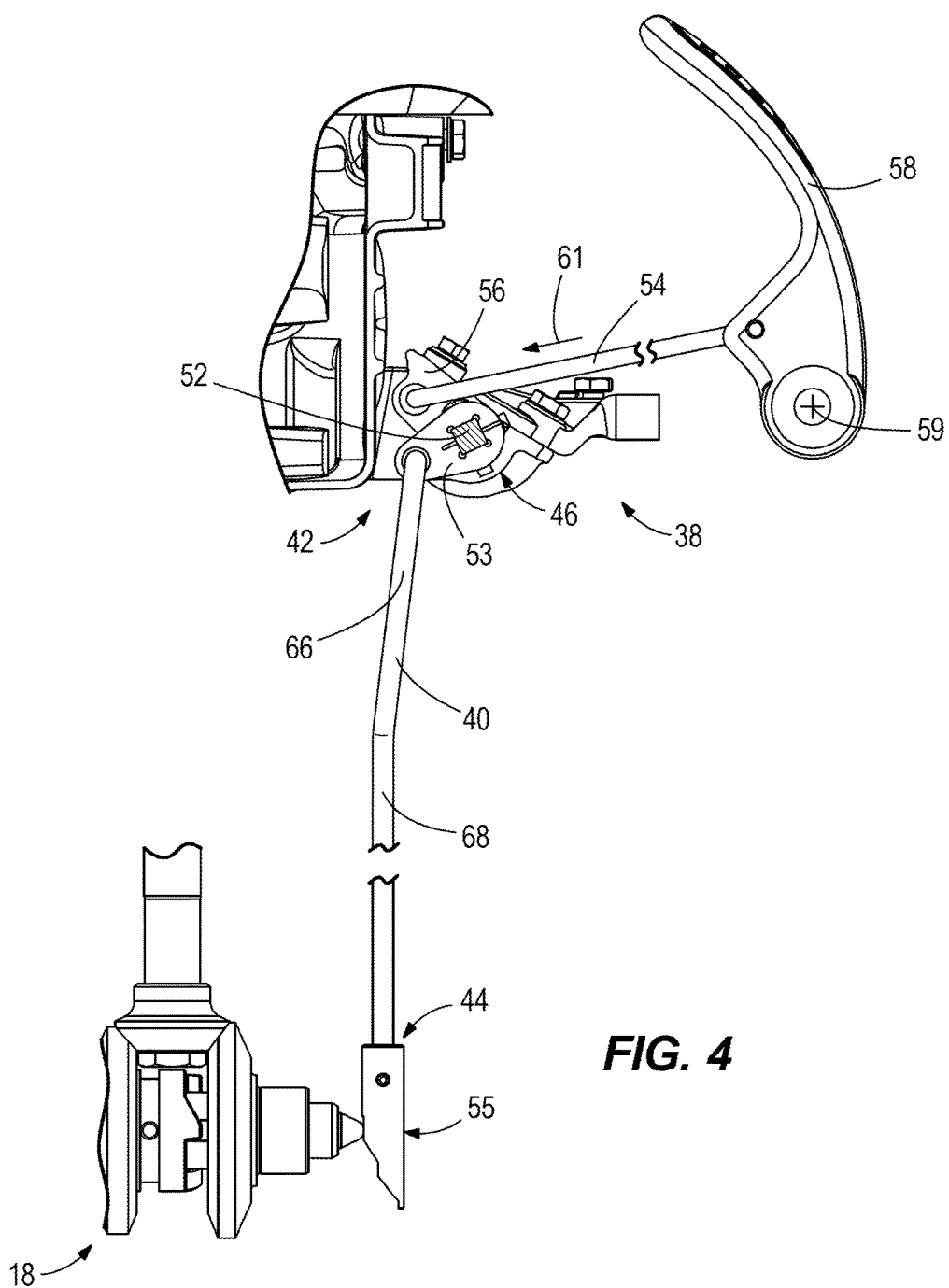
FIG. 4 is an isolated view of the shift actuator, shift shaft and a transmission for the outboard motor, showing the shift shaft in a reverse position.

Referring to FIGS. 2-4, the outboard motor 10 also has a shift system for operating the transmission 18. The shift system is a main subject of the present disclosure and includes a shift actuator 38 that is operable by the user of the outboard motor 10 and a shift shaft 40 having an upper end 42 coupled to the powerhead 12 via the shift actuator 38 and a lower end 44 coupled to the transmission 18. The shift shaft 40 generally vertically extends from the powerhead 12 to the transmission 18 via the conduit 36 in the mounting assembly 28. The exact configuration of the shift actuator 38 can vary from what is shown and described. For example, refer to the alternate examples shown in FIGS. 3-7, FIGS. 10-11, and FIGS. 12-13, respectively, which are further described herein below.

Referring now to FIGS. 2-7, a first example of the shift actuator 38 includes a pivot assembly 46 that pivots about a pivot axis 48 to thereby move the shift shaft 40 into distinct forward, reverse and neutral positions, which are shown in FIG. 7 in solid and phantom lines, respectively, and will be further described herein below. In this example, the pivot axis 48 horizontally extends relative to the outboard motor 10, i.e., transversely to the vertically extending shift shaft 40. The pivot assembly 46 includes a shift axle 52, which extends along the pivot axis 48 and is supported by a stationary bearing member 65 so that the shift axle 52 is pivotable with respect thereto. The pivot assembly 46 further includes a pivot lever 53 mounted on the shift axle 52 and connecting the upper end 42 of the shift shaft 40 to the shift axle 52. The pivot assembly 46 also includes a shift rod 54, which is connected to the shift axle 52 via another pivot lever 56, which is also mounted on the shift axle 52 and extends at an angle with respect to the pivot lever 53. A manually-operable shift handle 58 is connected to the shift rod 54 and, for example, can be supported by a conventional tiller arm as will be understood by one having ordinary skill in the art. Examples of suitable tiller arms having chassis for supporting the manually-operable shift handle 58 are provided in U.S. Design Pat. Nos. D794078 and D794079, which is incorporated herein by reference, in entirety. Manual pivoting of the shift handle 58 about the handle axis 59 causes axial movement of the shift rod 54, as shown by arrows 61, which in turn causes pivoting of the shift axle 52 about the pivot axis 48 via the pivot lever 56. The shift axle 52 is positionable into three distinct pivot positions, which correspond to forward, neutral, and reverse gears of the transmission 18. The three distinct pivot positions are defined by a detent mechanism 51 (see FIG. 3), which in this example includes a leaf spring 57 that is biased into a seated relationship with one of three circumferential recesses on the outer circumference of the shift axle 52. Pivoting of the shift axle 52 forces the leaf spring 57 out of engagement with one of the circumferential recesses. Continued pivoting of the shift axle 52 allows the spring force of the leaf spring 57 to bias the leaf spring 57 into engagement with a next circumferential recess. Pivoting of the shift axle 52, in turn, causes pivoting of the pivot lever 53 about the pivot axis 48. Pivoting of the pivot lever 53 causes vertical movement of the shift shaft 40, as can be seen by comparison of FIGS. 4-6 and by comparison of the solid and phantom lines in FIG. 7.

Referring to FIG. 1, the lower end 44 of the shift shaft 40 is engaged with the transmission 18. The manner of engagement can include any one of a number of conventional shift shaft-to-transmission connections, for example via a conventional clutch configured such that movement of the shift shaft 40 causes the clutch to actuate the transmission 18 into forward, reverse, and neutral gears. Suitable shift shaft and clutch arrangements of this type are taught in U.S. Pat. Nos. 9,174,715; 7,291,048; 6,544,083, which are incorporated herein by reference, in entirety. In general, a camming mechanism 55 is provided at the lower end 44 of the shift shaft 40 so that vertical movement of the shift shaft 40 actuates the clutch to thereby actuate the transmission 18. This type of arrangement is well known.

Figure 8:
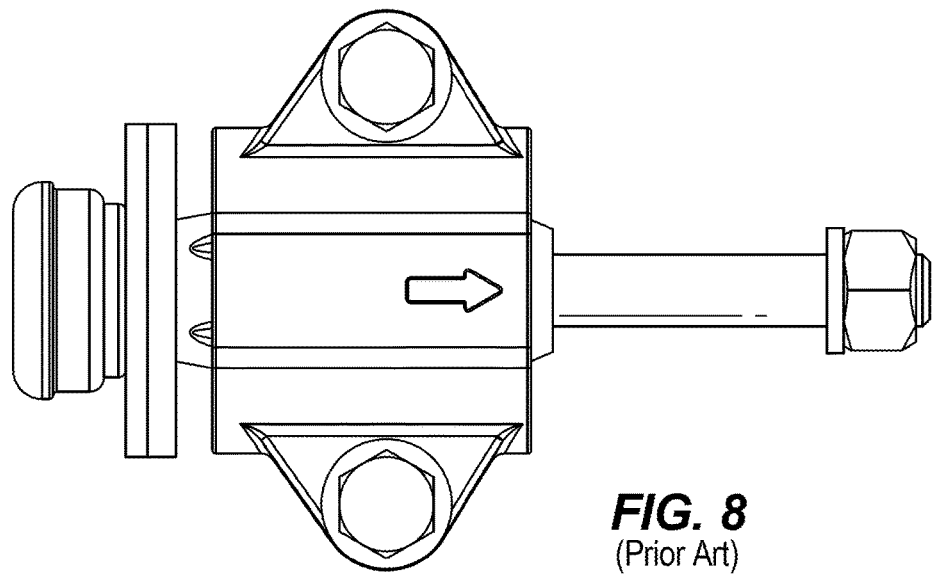
FIG. 8 is a prior art resilient mount for the resiliently mounting the powerhead of the outboard motor to the mounting assembly.
Figure 9:
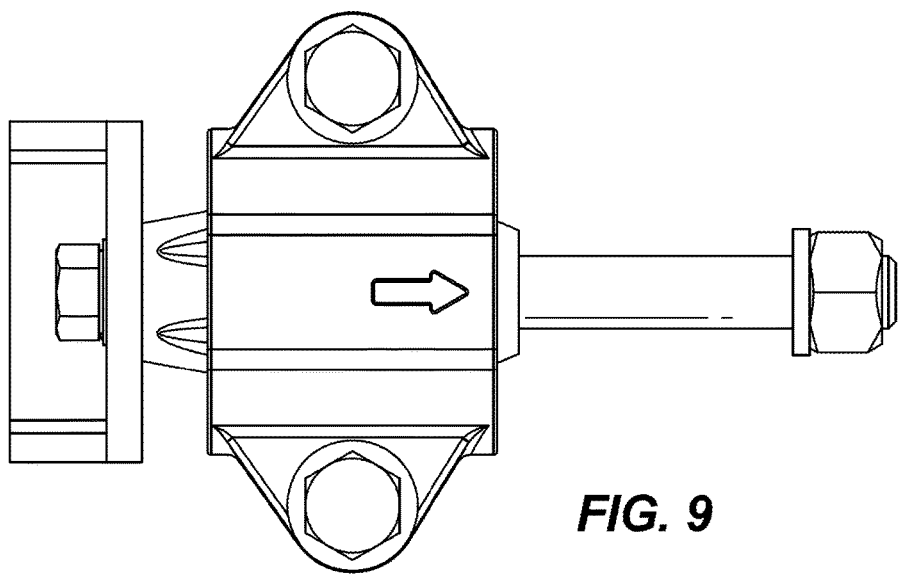
FIG. 9 is an exemplary resilient mount according to the present disclosure for resiliently mounting the powerhead of the outboard motor to the mounting assembly.

Referring now to FIGS. 8 and 9, the powerhead 12 is coupled to the mounting assembly 28 by one or more resilient mounts. As described in the above-incorporated U.S. Pat. No. 9,643,703, resilient mounts of the type shown in FIGS. 8 and 9 have a "stroke" that facilitates fore-aft movement of the powerhead 12 and shift shaft 40 with respect to the mounting assembly 28, which includes the above-noted conduit 36. Through research and experimentation, the present inventor has determined that most conventional outboard motor configurations have a shift shaft located in a steering pivot tube (as described herein above). The shift shaft is connected to the isolated mass (e.g. power head, etc.) and moves when thrust is applied to the outboard motor. However the limited fore-aft clearance space between the shift shaft and the conduit in the steering pivot tube constrains (i.e. limits) the available stroke of the resilient mount(s), i.e. prevents use of very soft mounts having a relatively large stroke. Smaller engines often have relatively smaller diameter steering pivot tubes and lower order vibrations, which requires relatively soft mounts with relatively large stroke. Upon the present inventor's realization that the conduit of the steering tube imposes a design constraint on the resiliency of the mounts, the present inventor endeavored to invent an improved shift arrangement for an outboard motor that allows for increased resiliency in the mounts (i.e., increased stroke—compare the small stroke in FIG. 8 to the large stroke in FIG. 9), while at the same time remaining within design constraints on available space within the outboard motor. The present disclosure is the result of these efforts.

Figure 5:
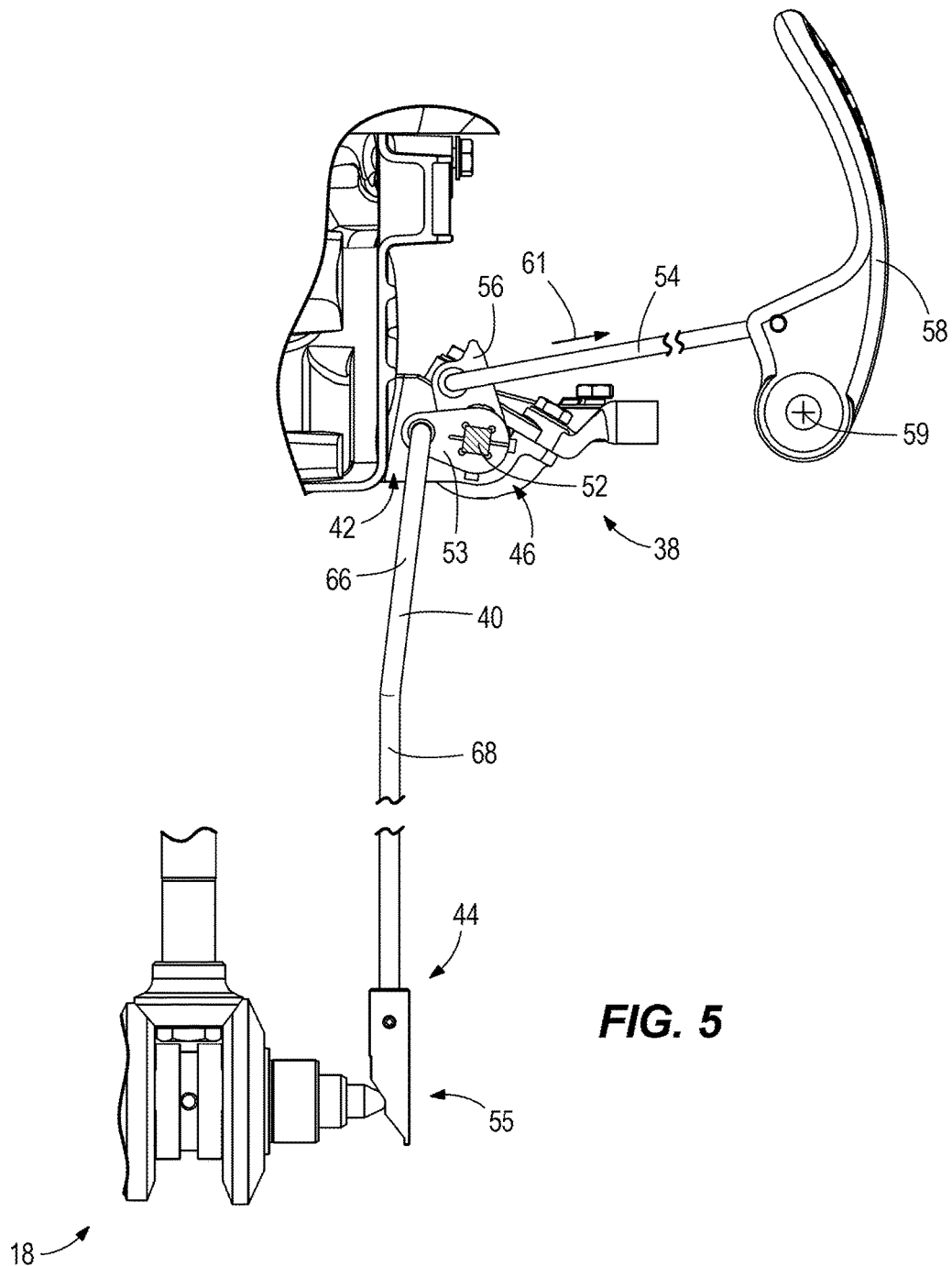
FIG. 5 is an isolated view of the shift actuator, shift shaft and a transmission for the outboard motor, showing the shift shaft in a neutral position.
Figure 6:
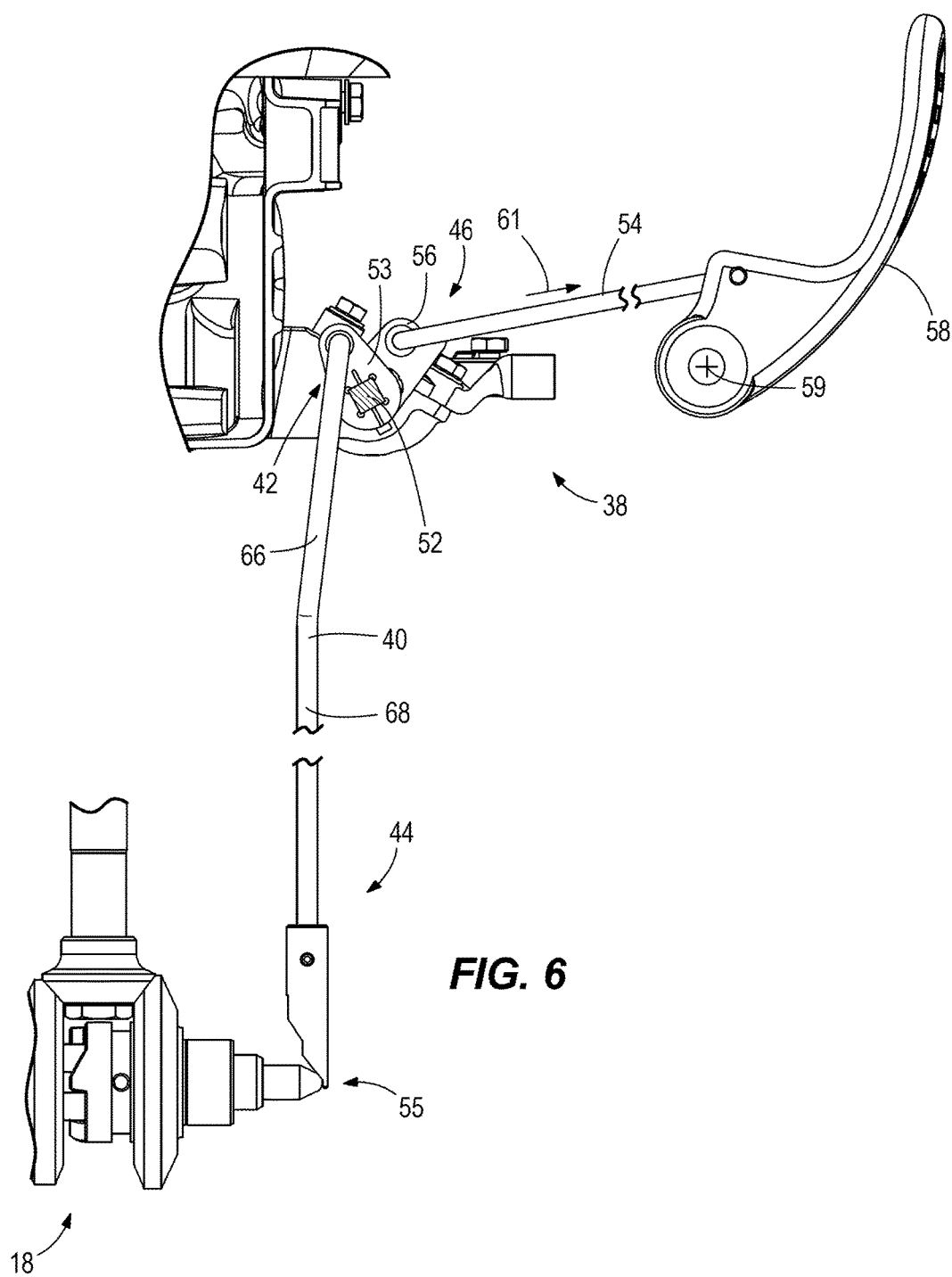
FIG. 6 is an isolated view of the shift actuator, shift shaft and a transmission for the outboard motor, showing the shift shaft in a forward position.

Referring to FIGS. 4-6 and particularly FIG. 7, actuation of the shift actuator 38 moves the shift shaft 40 into a reverse position (see FIG. 4) in which the transmission 18 is engaged in a reverse gear, a forward position (see FIG. 6) in which the transmission 18 is engaged in forward gear, and a neutral position (see FIG. 5) in which the transmission 18 is in neutral gear. FIG. 7 depicts the shift shaft 40 in neutral position in solid line and in forward and reverse positions in dashed line. As shown in FIG. 7, the conduit 36 through the steering tube 33 has a forward side 62 and an aftward side 64 relative to the fore-aft direction of the mounting assembly 28 of the outboard motor 10 (see arrow 63 in FIG. 1), particularly as it is mounted on the marine vessel. According to the present disclosure, in the forward position, the upper end 42 of the shift shaft 40 is advantageously positioned closer to the forward side 62 of the conduit 36 than the aftward side 64. In the reverse position, the upper end 42 of the shift shaft 40 is positioned closer to the aftward side 64 of the conduit 36 than the forward side 62. In the neutral position, the upper end 42 of the shift shaft 40 is positioned between the noted forward and reverse positions. By configuring the shift actuator 38 and shift shaft 40 in this manner, an increased fore-aft movement of the powerhead 12 and shift shaft 40 with respect to the steering tube 33 is facilitated, which advantageously allows for the outboard motor 10 to have resilient mounts that provide relatively softer resiliency (i.e. have increased stroke—compare FIGS. 8 and 9) in response to thrust forces on the outboard motor 10, as compared to other outboard motor configurations having the same shift shaft and steering tube configurations.

In the particular steering actuator example shown in FIGS. 1-7, the upper end 42 of the shift shaft 40 is connected to the pivot lever 53 such that in the forward position, the upper end 42 of the shift shaft 40 is located vertically higher than the pivot axis 48. In the neutral position, the upper end 42 of the shift shaft 40 is located vertically higher than the pivot axis 48. In the reverse position, the upper end 42 of the shift shaft 40 is located vertically lower than the pivot axis 48. As shown in FIG. 7, the upper end 42 of the shift shaft 40 and the pivot lever 53 extend or pivot through equal to or less than 90 degrees of rotation between the forward and reverse positions. In the illustrated example, the shift shaft 40 has an upper section 66 located at the pivot lever 53 and a lower section 68 that extends from the upper section 66 at an angle such that the shift shaft 40 does not engage the shift axle 52 as the shift shaft 40 is moved into the noted forward, reverse, and neutral positions. It will be understood by one having ordinary skill in the art that the same effect can be achieved by orienting the pivot lever 53 in a diametrically opposite position with respect to what is shown in FIG. 7, such that in each of the forward, neutral and reverse positions, the upper end 42 of the shift shaft 40 is located vertically lower than the pivot axis 48. In such an example, the pivot lever 53 in the reverse position would be angled closer to vertical than the pivot lever 53 in the forward position. The neutral position would be positioned between the forward and reverse positions, similar to what is shown in FIG. 7.

Figure 10:
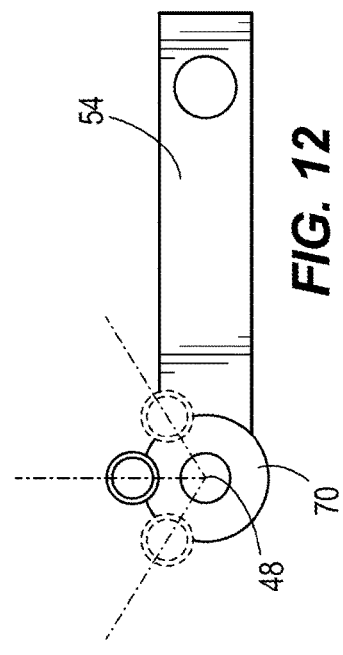
FIG. 10 is a top view of a second example of a shift actuator and shift shaft according to the present disclosure.
Figure 11:
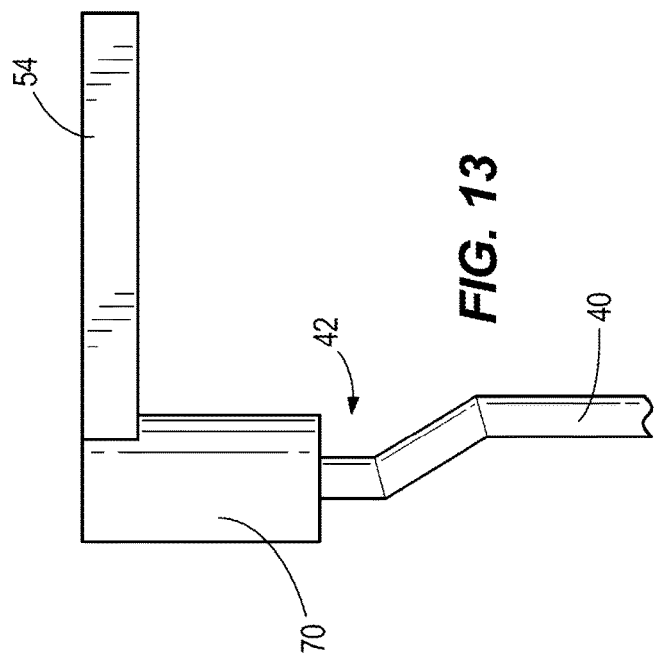
FIG. 11 is a side view of the second example.
Figure 12:
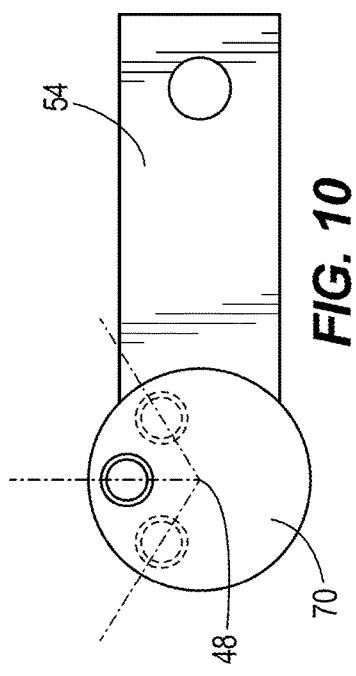
FIG. 12 is a top view of a third example of the shift actuator and shift shaft according to the present disclosure.
Figure 13:
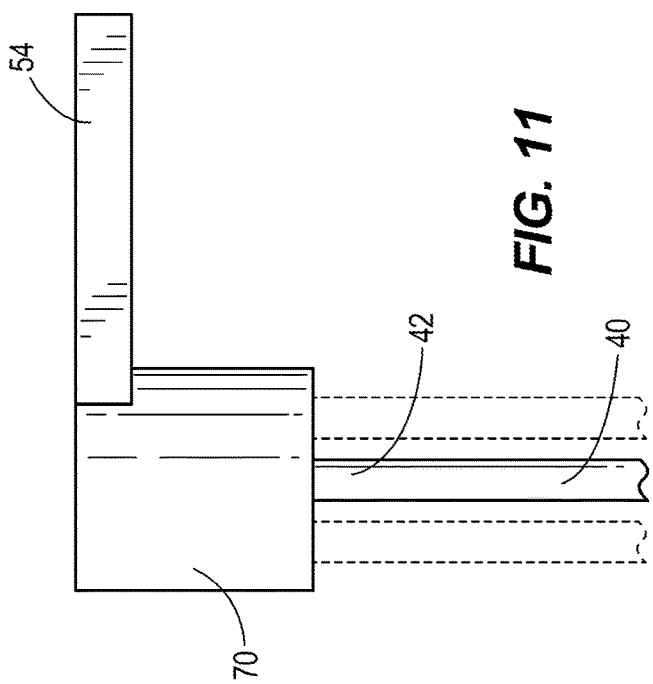
FIG. 13 is a side view of the third example.

Alternate examples of the shift actuator 38 and shift shaft 40 are depicted in FIGS. 10-11 and FIGS. 12-13. In both of these examples, the shift actuator 38 has a pivot axis 48 that vertically extends relative to the outboard motor 10, i.e. generally parallel to the noted driveshaft. Note that this is different than the example shown in FIGS. 2-7 having a horizontally extending pivot axis 48. In the examples shown in FIGS. 10-11 and 12-13, a bearing 70 is pivotable about the pivot axis 48 to thereby cause the shift shaft 40 to move into and out of the noted forward, reverse, and neutral positions, which are shown in dashed and solid lines, respectively. The upper end 42 of the shift shaft 40 is connected to the bearing 70 such that the shift shaft 40 is offset from the pivot axis 48. The bearing 70 rotates through about 20 to 160 degrees of rotation amongst the forward and reverse positions. In FIGS. 10-11, the shift shaft 40 is mounted internally of the bearing 70 and in FIGS. 12-13, the shift shaft 40 is mounted on an outer circumference of the bearing 70.

Thus, in certain examples described herein above, the shift system of the outboard motor is modified so that the pivot lever moves the upper end of the shift shaft forwardly in the conduit of the steering tube when actuating forward gear so that the shift shaft almost contacts the forward side of the conduit in the steering tube. Conversely, the lever moves the upper end of the shift shaft aftwardly when actuating reverse gear so that the shift shaft almost contacts the aftward side of the conduit in the steering tube. Advantageously according to this arrangement, almost the entire clearance between the shift shaft and the conduit in the steering tube can be used for both forward and reverse mount motion. This can increase available motion by 50-100% compared to prior art configurations for a given shift shaft and steering tube. It alternately allows for use of smaller and lighter steering tubes at a given mount stroke. As shown by comparison of the examples described above, the principals according to the present disclosure can be used in shift systems having rotating shift shafts and in shift systems having shift shafts that axially translate. In rotating systems, a similar advantage can be obtained by offsetting the shift shaft at its upper end from the pivot axis, or by providing appropriate bends in the shift shaft. The arrangements are applicable to configurations that utilize 180 degrees of rotation, but can also be used in configurations that only rotate 90 degrees.

Although only a few example examples have been described in detail above, those skilled in the art will readily appreciate that many modifications are possible in the example examples without materially departing from this invention. Accordingly, all such modifications are intended to be included within the scope of this disclosure as defined in the following claims.

What is claimed is:

1. An outboard motor comprising:
  a mounting assembly for connecting the outboard motor to a marine vessel;
  a powerhead;
  a transmission that transmits power from the powerhead to a propulsor configured to impart thrust on a body of water in which the outboard motor is operated; and
  a shift shaft that extends from the powerhead to the transmission via a conduit in the mounting assembly, the conduit having forward and aftward sides relative to the mounting assembly;
  wherein the shift shaft is positionable into a forward position in which the transmission is engaged in forward gear, reverse position in which the transmission is engaged in reverse gear, and a neutral position in which the transmission is in neutral gear, and
  wherein in the forward position an upper end of the shift shaft is positioned closer to the forward side of the conduit than the aftward side of the conduit, in the reverse position the upper end of the shift shaft is positioned closer to the aftward side of the conduit than the forward side of the conduit, and in the neutral position the upper end of the shift shaft is positioned between the forward and reverse positions, thus facilitating fore-aft movement of the powerhead and shift shaft with respect to the mounting assembly.

2. The outboard motor according to claim 1, further comprising a resilient mount that couples the powerhead to the mounting assembly and facilitates the fore-aft movement of the powerhead and shift shaft with respect to the mounting assembly.

3. The outboard motor according to claim 1, further comprising a shift actuator that is operable by a user of the outboard motor, the shift actuator being configured to move the shift shaft into and out of the forward, reverse and neutral positions.

4. The outboard motor according to claim 3, wherein the shift actuator comprises a pivot assembly that pivots about a pivot axis to thereby cause the shift shaft to move into and out of the forward, reverse and neutral positions.

5. The outboard motor according to claim 4, wherein the pivot axis horizontally extends relative to the outboard motor, and wherein the pivot assembly comprises a lever connected to the upper end of the shift shaft, and wherein the lever is pivotable about the pivot axis.

6. The outboard motor according to claim 5, wherein the upper end of the shift shaft is connected to the lever such that in the forward position, the upper end of the shift shaft is located vertically higher than the pivot axis.

7. The outboard motor according to claim 6, wherein the upper end of the shift shaft is connected to the lever such that in the neutral position, the upper end of the shift shaft is located vertically higher than the pivot axis.

8. The outboard motor according to claim 7, wherein the lever pivots through between 20 and 160 degrees of rotation between the forward and reverse positions.

9. The outboard motor according to claim 7, wherein the shift actuator comprises a shift axle on which the lever is mounted, the shift axle horizontally extending along the pivot axis, wherein the shift shaft comprises an upper section located at the lever and a lower section that extends from the upper section at an angle such that the shift shaft does not engage the shift axle when the shift shaft is moved into the reverse position.

10. The outboard motor according to claim 9, further comprising a shift rod connected to the shift axle and configured to pivot the shift axle about the pivot axis and thus cause the lever to pivot about the shift axle.

11. The outboard motor according to claim 4, wherein the pivot axis vertically extends relative to the outboard motor and further comprising a bearing that is pivotable about the pivot axis to thereby cause the shift shaft to move into the forward, reverse and neutral positions.

12. The outboard motor according to claim 11, wherein the upper end of the shift shaft is coupled to the bearing and offset from the pivot axis.

13. The outboard motor according to claim 12, wherein the upper end of the shift shaft extends at an angle with respect to the pivot axis.

14. The outboard motor according to claim 13, wherein the bearing rotates through between 20 to 160 degrees of rotation between the forward and reverse positions.

15. The outboard motor according to claim 1, wherein in the forward position, a lower end of the shift shaft is positioned closer to the aftward side of the conduit than the forward side of the steering conduit, in the reverse position the lower end of the shift shaft is positioned closer to the forward side of the conduit than the aftward side of the conduit, and in the neutral position the lower end of the shift shaft is positioned between the forward and reverse positions.

16. An outboard motor comprising:
a mounting assembly for connecting the outboard motor to a marine vessel;
a powerhead;
a transmission that transmits power from the powerhead to a propulsor configured to impart thrust on a body of water in which the outboard motor is operated;
a shift shaft that extends from the powerhead to the transmission via a conduit in the mounting assembly, the conduit having forward and aftward sides relative to the mounting assembly,
wherein the shift shaft is positionable into a forward position in which the transmission is engaged in forward gear, reverse position in which the transmission is engaged in reverse gear, and a neutral position in which the transmission is in neutral gear;
a shift actuator that is operable by a user of the outboard motor, the shift actuator being configured to move the shift shaft into and out of the forward, reverse and neutral positions; and
a resilient mount that couples the powerhead to the mounting assembly and facilitates the fore-aft movement of the powerhead and shift shaft with respect to the mounting assembly;
wherein in the forward position an upper end of the shift shaft is positioned closer to the forward side of the conduit than the aftward side of the conduit, in the reverse position the upper end of the shift shaft is positioned closer to the aftward side of the conduit than the forward side of the conduit, and in the neutral position the upper end of the shift shaft is positioned between the forward and reverse positions, thus facilitating fore-aft movement of the powerhead and shift shaft with respect to the mounting assembly.

17. The outboard motor according to claim 16, wherein the shift actuator comprises a pivot assembly that pivots about a pivot axis to thereby cause the shift shaft to move into and out of the forward, reverse and neutral positions.

18. The outboard motor according to claim 17, wherein the pivot axis horizontally extends relative to the outboard motor, and wherein the pivot assembly comprises a lever connected to the upper end of the shift shaft, and wherein the lever is pivotable about the pivot axis.

19. The outboard motor according to claim 17, wherein the pivot axis vertically extends relative to the outboard motor and further comprising a bearing that is pivotable about the vertical axis to thereby cause the shift shaft to move into and out of the forward, reverse and neutral positions.

20. The outboard motor according to claim 17, further comprising a shift actuator that is operable by a user of the outboard motor, the shift actuator being configured to move the shift shaft into and out of the forward, reverse and neutral positions.

* * * * *